United States Patent

Spalter et al.

(10) Patent No.: US 10,404,906 B2
(45) Date of Patent: Sep. 3, 2019

(54) SYSTEMS AND METHODS FOR CAPTURING CONTENT

(71) Applicant: Facebook, Inc., Menlo Park, CA (US)

(72) Inventors: Ian Spalter, San Mateo, CA (US); Michel Krieger, San Francisco, CA (US); Ian McIntyre Silber, San Jose, CA (US); Baback Elmieh, Palo Alto, CA (US); John Russell Whaley, San Jose, CA (US); Rex Crossen, Oakland, CA (US); Alexandre Jais, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/855,418

(22) Filed: Dec. 27, 2017

(65) Prior Publication Data

US 2019/0199919 A1 Jun. 27, 2019

(51) Int. Cl.
*H04N 5/232* (2006.01)
*H04N 5/262* (2006.01)
*H04N 5/225* (2006.01)
*H04N 21/2187* (2011.01)
*H04N 21/4223* (2011.01)
*G06F 16/955* (2019.01)
*H04L 12/58* (2006.01)

(52) U.S. Cl.
CPC ....... *H04N 5/23225* (2013.01); *G06F 16/955* (2019.01); *H04N 5/2256* (2013.01); *H04N 5/2621* (2013.01); *H04N 21/2187* (2013.01); *H04N 21/4223* (2013.01); *H04L 51/32* (2013.01)

(58) Field of Classification Search
None
See application file for complete search history.

(56) References Cited

U.S. PATENT DOCUMENTS 5,552,850 A * 9/1996 Matsumoto ............ G03B 17/06
396/420

\* cited by examiner

*Primary Examiner* — Mark T Monk
(74) *Attorney, Agent, or Firm* — Shepppard Mullin Richter & Hampton LLP

(57) ABSTRACT

Systems, methods, and non-transitory computer-readable media can determine a first faceplate installed in the computing device, the first faceplate being an attachment that is capable of being physically installed in the computing device. A faceplate profile associated with the first faceplate can be determined. At least one setting of the computing device or operation performed by the computing device can be modified based at least in part on information specified by the faceplate profile associated with the first faceplate.

20 Claims, 8 Drawing Sheets

SYSTEMS AND METHODS FOR CAPTURING CONTENT

FIELD OF THE INVENTION

The present technology relates to the field of capturing content. More particularly, the present technology relates to techniques for capturing content using electronic devices.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

SUMMARY

Various embodiments of the present disclosure can include systems, methods, and non-transitory computer readable media configured to determine a first faceplate installed in the computing device, the first faceplate being an attachment that is capable of being physically installed in the computing device. A faceplate profile associated with the first faceplate can be determined. At least one setting of the computing device or operation performed by the computing device can be modified based at least in part on information specified by the faceplate profile associated with the first faceplate.

In an embodiment, the information includes instructions for modifying at least one illumination pattern for one or more light sources associated with the computing device.

In an embodiment, the illumination pattern includes at least one of flashing one or more of the light sources, blinking one or more of the light sources, activating one or more light sources that emit a particular color, or activating one or more light sources at a particular brightness level.

In an embodiment, at least one of the light sources is masked by the first faceplate to represent a particular shape or icon.

In an embodiment, the information includes instructions for applying at least one visual filter to content captured by the computing device, wherein the at least one visual filter modifies subject matter represented in the content.

In an embodiment, the at least one visual filter applies at least one face filter to modify at least one human face represented in the captured subject matter.

In an embodiment, the at least one visual filter applies at least one environment filter to modify at least a portion of an environment represented in the captured subject matter.

In an embodiment, content captured by the computing device corresponds to at least a media content item or a live content stream.

In an embodiment, the content is published through a social networking system.

In an embodiment, the systems, methods, and non-transitory computer readable media are configured to determine a second faceplate installed in the computing device, the second faceplate being an attachment that is capable of being physically installed in the computing device; determine a faceplate profile associated with the second faceplate; and modify at least one setting of the computing device or operation performed by the computing device based at least in part on information specified by the faceplate profile associated with the second faceplate.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
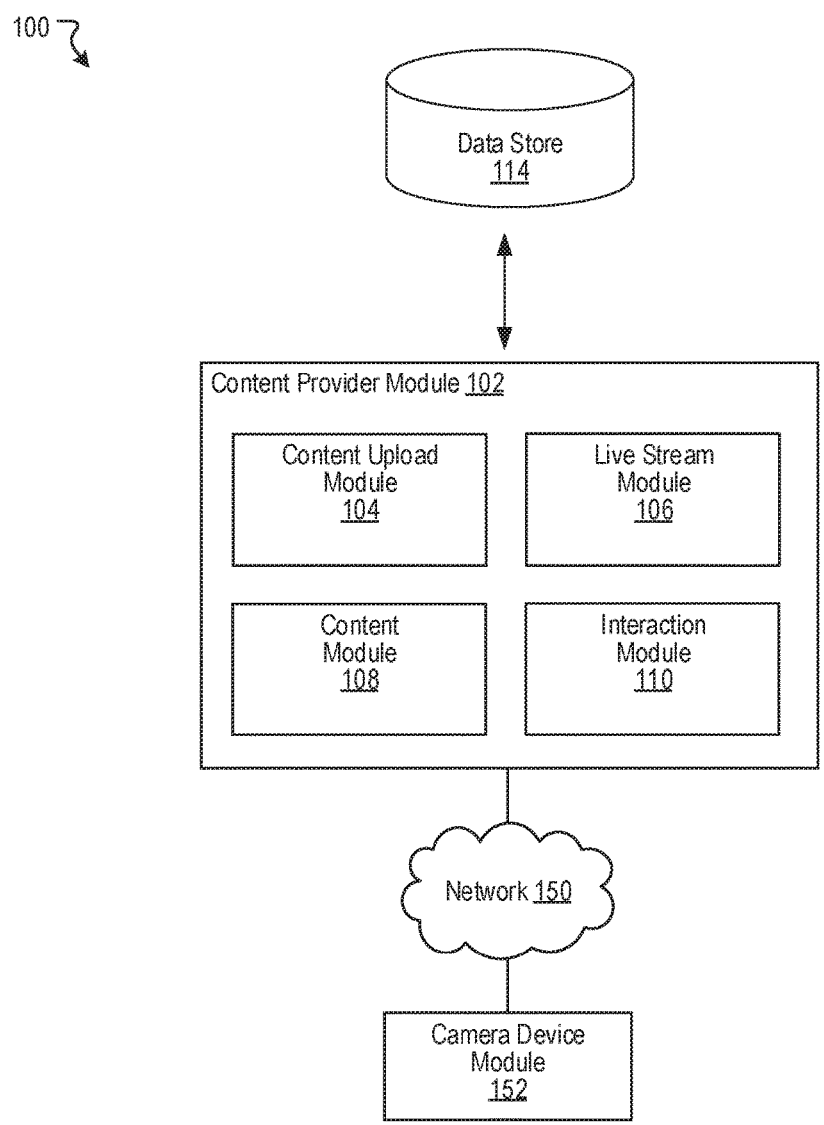
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Capturing Content

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

Under conventional approaches, content may be posted and/or broadcast through a content provider (e.g., social networking system). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. The content provider encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until, for example, the broadcaster discontinues broadcasting the live content stream or the user instructs the computing device to stop accessing the live content stream.

In some instances, the live content stream may be broadcasted from a standalone camera device that is designed to capture and live stream content. Users, or viewers, can similarly access this live content stream through the content provider using their computing devices. In some instances, these users may interact with the live content stream (e.g., like, comment, etc.) through the content provider. For example, a user may select an option to "like" the live content stream. In general, the broadcaster can access various information describing such events (e.g., likes, comments, etc.) by interacting with the content provider using a computing device separate from the standalone camera device through which the live content stream is being captured and streamed. Such information is generally not accessible using the standalone camera device. In some instances, it can be beneficial for such information to be communicated to the broadcaster through the camera device without requiring a separate computing device. Further, it can be beneficial to allow the broadcaster to easily modify settings (e.g., live stream settings) directly from the camera device. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a camera device can be used to capture and share content through a content provider (e.g., social networking system). For example, the camera device can be placed at a particular location (e.g., theme park ride entrance, office break room, home, etc.). In this example, individuals can interact with the camera device to share content through a content provider, such as the social networking system. For example, in some embodiments, the camera device can capture and provide media content items (e.g., images, videos, looping videos, etc.) to be shared as posts and/or stories through the social networking system. In some embodiments, the camera device can be used to capture live content streams to be broadcasted through the social networking system. In various embodiments, events (e.g., user engagement, interaction, etc.) that relate to content posted or streamed from the camera device can be indicated or confirmed using one or more light sources (e.g., light-emitting diodes or LEDs) installed in the camera device. For example, these light sources may communicate different information by emitting light using various pre-defined illumination patterns (or sequences). These illumination patterns may involve flashing one or more light sources, blinking one or more light sources, illuminating light sources that emit a particular color, and/or illuminating light sources at some brightness level, to name some examples. In various embodiments, various faceplates can be installed in the camera device. In some embodiments, a faceplate can be associated with a profile that modifies device settings and/or device operation. For example, a faceplate profile may instruct the camera device to apply one or more visual filters (e.g., masks, borders, banners, color filters, etc.) to subject matter reflected in a live content stream being captured and broadcasted using the camera device. In another example, the faceplate profile may instruct the camera device to apply one or more pre-defined illumination patterns (or sequences) to activate light sources associated with the camera device. Such illumination patterns can be used to communicate various information to a user (or broadcaster) utilizing the camera device. Many variations are possible.

FIG. 1 illustrates an example system 100 including an example content provider module 102, according to an embodiment of the present disclosure. As shown in the example of FIG. 1, the content provider module 102 can include a content upload module 104, a live stream module 106, a content module 108, and an interaction module 110. In some instances, the example system 100 can include at least one data store 114. A camera device module 152 can interact with the content provider module 102 over one or more networks 150 (e.g., the Internet, a local area network, a cellular network, etc.). The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 and/or the camera device module 152 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 and/or the camera device module 152 can, in part or in whole, be implemented within or configured to operate in conjunction with a social networking system (or service), such as the social networking system 630 of FIG. 6. In some instances, the content provider module 102 and/or the camera device module 152 can be, in part or in whole, implemented within or configured to operate in conjunction or be integrated with a client computing device, such as the user device 610 of FIG. 6. For example, the content provider module 102 and/or the camera device module 152 can be implemented as or within a dedicated application (e.g., app), a program, or an applet running on a user computing device or client computing system. The application incorporating or implementing instructions for performing some, or all, functionality of the content provider module 102 and/or the camera device module 152 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The at least one data store 114 can be configured to store and maintain various types of data. For example, the data store 114 can store information describing various content that has been posted by users of a social networking system and/or by camera devices interacting with the social networking system. In some implementations, the at least one data store 114 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 114 can store information associated with users, such as user identifiers, user information, profile information, user specified settings, content produced or posted by users, and various other types of user data.

The content provider module 102 can be configured to provide users with access to media content items that are posted through a social networking system. In general, a media content item may correspond to an image, text, audio, video, or looping video, to name some examples. For example, a user can interact with an interface that is provided by a software application (e.g., a social networking application) running on a computing device of the user. This interface can include an option for posting, or uploading, media content items to the social networking system. When posting a media content item, the content upload module 104 can be utilized to communicate data describing the media content item from the computing device (e.g., camera device) to the social networking system. The social networking system can then provide the media content item through the social networking system including, for example, in one or more news feeds and/or stories. In some embodiments, the content upload module 104 provides an application programming interface (API) through which content can be uploaded. In such embodiments, a camera device in which the camera device module 152 is implemented can use this application programming interface to post, or upload, media content items to the social networking system. In some embodiments, the content provider module 102 can authenticate the camera device before posting any content received from the camera device. For example, the content provider module 102 may authenticate the camera device based on login credentials (e.g., username and password, cryptographic token, etc.) provided by the camera device module 152.

In some embodiments, users can live stream content through the social networking system. When initiating a live content stream, the live stream module 106 can be utilized to communicate data (e.g., audio data, video data, etc.) corresponding to the content to be streamed live from a computing device and through the social networking system. In some embodiments, this computing device can be a camera device in which the camera device module 152 is implemented. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream. In some embodiments, the live stream module 106 can publish live content streams being broadcasted through the social networking system in various news feeds.

In some embodiments, users can access content provided by the camera device module 152 (e.g., media content items, live content streams) using the content module 108. For example, the content module 108 can include content in a user's news feed. Such content may include on-demand media content items (e.g., video on-demand or "VOD") as well as content that is being streamed live. In this example, the user can access content while browsing the news feed. In another example, the user can access content by performing searches through the social networking system. For example, the user can search for a given media content item, for a user that posted a media content item, and/or for search terms that correspond to a media content item. In another example, the user may select an option to view a live content stream and, in response, the social networking system can send data corresponding to the live content stream to a computing device of the user. In this example, the social networking system can continue sending data corresponding to the live content stream until, for example, the broadcaster of the live content stream discontinues streaming or if the user selects an option to discontinue playback of the live content stream.

In some embodiments, when a user accesses a media content item or live content stream, the accessed content is presented through a display screen of the user's computing device. In some embodiments, the user can select a number of options to provide various types of feedback for media content items and/or live content streams. For example, a user may want to endorse, or "like", a media content item. In this example, the user can select a "like" option provided in the interface to like, or endorse, the media content item. The interaction module 110 can determine when a user likes a given media content item and can store information describing this relationship. In some embodiments, the interface includes a set of options for reacting to content being presented in the media content item. These options can include a "love" (or "heart") reaction option, a "haha" (or funny) reaction option, a "wow" (or surprised) reaction option, a "sad" reaction option, and an "angry" reaction option, to name some examples. Similarly, the interaction module 110 can determine when a user selects a reaction option in response to a given media content item and can store information describing this relationship. The interaction module 110 can also determine when other forms of user interaction are performed and can store information describing such interactions (e.g., information describing a type of interaction, an identity of the user, an identity of a broadcaster, and an identifier for the media content item, to name some examples). For example, a viewer may want to post a comment in response to a live content stream. In this example, the viewer can select an option provided in the interface to enter and post the comment for the desired live content stream. The interaction module 110 can determine when a viewer posts a comment in response to a given live content stream and can store information describing this relationship. In some embodiments, the interaction module 110 can determine when users share content (e.g., media content items, live content streams) with other users and can store information describing such relationships. Many variations are possible.

In various embodiments, the camera device module 152 can be configured to capture and provide content to be published through the content provider module 102. For example, the camera device module 152 can provide captured media content items (e.g., images, videos, looping videos, etc.) to the content provider module 102 over the network 150 for publication. In another example, the camera device module 152 can provide a live content stream to the content provider module 102 over the network 150 for broadcasting. As yet a further example, the camera device module 152 can manage illumination of lights sources associated with a camera device. For example, the light sources can be illuminated to provide feedback to a broadcaster (or other persons) utilizing the camera device. In various embodiments, various faceplates can be installed in the camera device. In some embodiments, a faceplate can be associated with a profile that modifies camera device settings and/or camera device operation. For example, a faceplate profile may instruct the camera device to apply one or more visual filters (e.g., masks, borders, banners, color filters, etc.) to subject matter reflected in a live content stream being captured and broadcasted using the camera device. In another example, the faceplate profile may instruct the camera device to apply one or more pre-defined illumination patterns (or sequences) to activate light sources associated with the camera device. Such illumination patterns can be used to communicate various information to a user (or broadcaster) utilizing the camera device. Many variations are possible. In some embodiments, the camera device module 152 can be implemented as a software application running on a computing device (e.g., camera device). More details regarding the camera device module 152 will be provided below with reference to FIG. 2.

Figure 2:
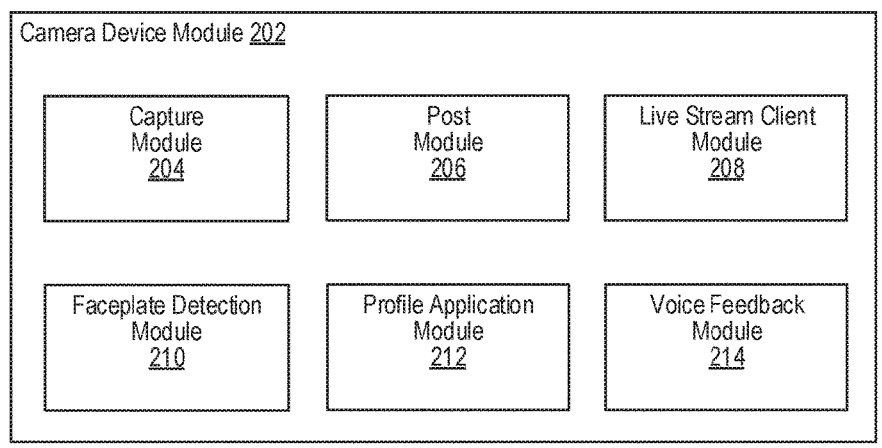
FIG. 2 illustrates an example of a camera device module, according to an embodiment of the present disclosure.

FIG. 2 illustrates an example of a camera device module 202, according to an embodiment of the present disclosure. In some embodiments, the camera device module 152 of FIG. 1 can be implemented as the camera device module 202. As shown in FIG. 2, the camera device module 202 can include a capture module 204, a post module 206, a live stream client module 208, a faceplate detection module 210, a profile application module 212, and a voice feedback module 214.

In various embodiments, the camera device module 202 can be implemented in a camera device that is capable of capturing and storing subject matter as media content items (e.g., images, videos, looping videos, etc.). The camera device can include one or more processors and memory. The processors can be configured to perform various operations upon interpreting machine-readable instructions stored in the memory. The camera device can also be configured to interact with a social networking system (e.g., the content provider module 102 of FIG. 1) through which captured media content items can be published. In some embodiments, the camera device module 202 can also provide a live broadcasting option that can be selected to broadcast live content streams through the social networking system. In some instances, the camera device can be installed at a fixed geographic location or point of interest.

The capture module 204 can be configured to capture various subject matter using the camera device. Such subject matter can be stored as media content items (e.g., images, videos, looping videos, etc.). In some embodiments, the capture module 204 can be instructed to capture media content items based on user commands applied to the camera device. For example, the camera device can be equipped with options (e.g., buttons) which, when selected, cause the capture module 204 to capture subject matter using the camera device. In some embodiments, the camera device can be configured to automatically capture media content items without manual commands or prompting. For example, the capture module 204 can be configured to periodically (or continuously) evaluate subject matter positioned within a viewfinder of the camera device. During evaluation, the capture module 204 can determine whether the subject matter satisfies any conditions for automatically capturing media content items. For example, a condition for automatically capturing media content items may require that a threshold number of individuals (e.g., one or more individuals) be positioned within the viewfinder of the camera device. In this example, the camera device can be instructed to capture one or more media content items once a threshold number of individuals are detected within the viewfinder. In another example, a condition for automatically capturing content may require that one or more individuals positioned within the viewfinder be smiling or otherwise exhibit a particular expression. In this example, the camera device can automatically capture one or more media content items once individuals detected within the viewfinder are determined to be smiling. In yet another example, a condition for automatically capturing content may require that one or more individuals positioned within the viewfinder are looking at the camera device. In this example, the camera device can be instructed to capture one or more media content items once individuals detected within the viewfinder are determined to be gazing at the camera device. Many variations are possible.

In various embodiments, the capture module 204 can use one or more trained machine learning models to evaluate captured subject matter. For example, a machine learning model (image classifier) can be trained to identify features that are represented in captured subject matter. These features can include identities, or names, of individuals, objects, activities, facial expressions, gaze direction, and moods, to name some examples. Such features can be used by the capture module 204 to determine when to automatically capture content. In some embodiments, when storing captured subject matter as a media content item, the capture module 204 can associate the media content item with information describing features that were detected in the captured subject matter. For example, a media content item (e.g., image) of an individual may be associated with detected information indicating the individual's name (or username), facial expression, mood, and geographic location.

The post module 206 can be configured to post media content items captured by the camera device. In general, media content items may be posted in user-specific content feeds or stories. For example, in some embodiments, a media content item in which a first user is represented can be posted in a content feed associated with the first user and/or respective content feeds of users that are followers (or friends of) the first user.

In some embodiments, the camera device module 202 can provide an option to broadcast live content streams through the social networking system. When this option is selected, the live stream client module 208 can interact with the live stream module 106 of FIG. 1 for purposes of streaming live content captured by the camera device module 202. The live stream client module 208 can implement any generally known techniques that allow for live streaming of content including, for example, the Real Time Messaging Protocol (RTMP).

In some embodiments, various faceplates can be installed in the camera device. In general, a faceplate may be a physical attachment that can be constructed from various materials. Further, each faceplate can be designed to be physically attached to the camera device. For example, a faceplate can be physically attached to a front, camera-facing side of the camera device. Many variations are possible. In some embodiments, such faceplates can each be associated with a corresponding faceplate profile. As mentioned, in various embodiments, faceplate profiles can be applied to modify one or more settings of the camera device and/or one or more operations performed by the camera device. For example, the faceplate detection module 210 can determine when a faceplate is installed in the camera device. The faceplate detection module 210 can also determine a corresponding faceplate profile associated with the installed faceplate. For example, in some embodiments, the faceplate detection module 210 may receive identifying information (e.g., faceplate identifier) from the installed faceplate. In this example, the faceplate detection module 210 can obtain the corresponding faceplate profile using the identifying information. In some embodiments, the faceplate profile can be stored in the camera device. In some embodiments, the faceplate profile can be purchased and/or downloaded from a social networking system (e.g., the social networking system 630 of FIG. 6). In some embodiments, faceplate profiles may be provided by faceplates upon installation in the camera device. For example, in some embodiments, the faceplate detection module 210 may receive a faceplate profile directly from the installed faceplate. In such embodiments, the faceplate detection module 210 can apply the received faceplate profile to modify camera device settings and/or operations as defined (or specified) by instructions included in the faceplate profile. Many variations are possible. In general, faceplate information (e.g., faceplate identifying information, faceplate profiles, etc.) can be communicated using well-known conventional techniques. For example, a faceplate may include electronic connectors that interface with (or connect to) corresponding electronic connectors in the camera device. Such electronic connectors can be used to communicate faceplate information from the faceplate to the camera device. In another example, a faceplate may implement wireless communication technology (e.g., near-field communication, Bluetooth Low Energy, etc.) to broadcast and/or wirelessly communicate faceplate information to the camera device. Many variations are possible.

The profile application module 212 can be configured to apply faceplate profiles to modify one or more settings of the camera device and/or one or more operations performed by the camera device. For example, in some embodiments, the profile application module 212 can apply a faceplate profile to modify operation of a set of light sources (e.g., light-emitting diodes or LEDs) associated with the camera device. In some instances, these light sources may be illuminated differently based on illumination patterns (or sequences) in order to visually convey various information. For example, a first illumination pattern may be used to convey a first type of user interaction (e.g., like) with content provided by the camera device. Similarly, a second illumination pattern may be used to convey a second type of user interaction (e.g., reaction) with the content. Such user interactions may be received at a social networking system (e.g., the social networking system 630 of FIG. 6) through which the content is being shared, for example.

In various embodiments, different faceplates can be installed in the camera device to modify illumination patterns used to visually convey information. For example, installation of a first faceplate may cause one or more light sources of the camera device to emit a red color when conveying a type of user interaction. The light sources can be illuminated based on instructions specified in a faceplate profile associated with the first faceplate. In this example, installing a second faceplate in the camera device may cause one or more light sources of the camera device to emit a blue color when conveying the same type of user interaction. Again, the light sources can be illuminated differently based on instructions specified in a faceplate profile associated with the second faceplate. Many variations are possible. For example, in some embodiments, installation of a faceplate in the camera device can modify an illumination pattern used to visually simulate a countdown using one or more light sources before the camera device captures content (e.g., media content items, live content streams). In such embodiments, the illumination pattern can be modified based on instructions specified in a faceplate profile associated with the installed faceplate. In some embodiments, the simulated countdown can provide a user (or broadcaster) with a visual indication of when the camera device will begin capturing content (e.g., media content items, live content streams). In this example, the faceplate profile can include instructions that also modify a countdown duration (e.g., three-second countdown versus a five-second countdown) utilized by the camera device before capturing content. In some embodiments, installation of a faceplate in the camera device can modify an illumination pattern used to visually indicate when the camera device is capturing content. In such embodiments, the illumination pattern can be modified based on instructions specified in a faceplate profile associated with the installed faceplate. In some embodiments, different illumination patterns may be used to visually convey when the camera device is capturing a media content item or when the camera device is capturing a live content stream. In some embodiments, when a faceplate is constructed of a reflective surface (e.g., mirror), the camera device can automatically detect colors represented in subject matter visible within the reflective surface. In such embodiments, the camera device can modify one or more light sources in the camera device so those light sources emit colors that are distinguishable from the colors represented in the subject matter. For example, if a broadcaster visible within the reflective surface is wearing a red outfit, then the light sources can be configured to emit colors that are distinguishable from the color red. Many variations are possible.

In various embodiments, instructions corresponding to illumination patterns as specified in a given faceplate profile can involve flashing or blinking one or more light sources. In some embodiments, an illumination pattern may involve flashing or blinking one or more light sources that emit one or more particular colors. For example, installation of a faceplate in the camera device can cause the camera device to activate light sources that emit the color red to visually indicate a first type of user interaction and light sources that emit the color green to visually indicate a second type of user interaction. In this example, the light sources can be activated based on instructions specified in a faceplate profile associated with the installed faceplate. In some embodiments, an illumination pattern may involve flashing or blinking one or more light sources based on some pre-defined order. In various embodiments, an illumination pattern may involve varying the brightness of one or more light sources, diffusing one or more of the light sources, fading between one or more illuminated light sources, or any combination thereof. For example, light diffusion can be used to indicate a volume of some user interaction (e.g., likes, reactions, comments, etc.) received for a live content stream being broadcasted using the camera device. For example, light diffusion can be increased in proportion to the amount of user interaction received. In some embodiments, faceplates can be used to partially or wholly mask one or more light sources associated with the camera device. That is, one or more portions of the faceplates can have varying levels of translucence or transparency to allow a desired amount of light from the light sources to pass through the portions. For example, in some embodiments, one or more light sources associated with the camera device can be masked by an installed faceplate to visually represent a shape or icon. For example, a first light source may be masked to visually represent a "like" icon, a second light source may be masked to visually represent a "comment" icon, and a third light source may be masked to visually represent a "heart" icon. In this example, the first light source as masked can be illuminated when a user likes content being provided by the camera device. Similarly, the second light source as masked can be illuminated when a user posts comments in response to the content being provided by the camera device. Further, the third light source as masked can be illuminated when a user selects an option corresponding to a "heart" reaction. Many variations are possible.

In some embodiments, installation of a faceplate can cause one or more filters to be applied to subject matter (image data) reflected in content (e.g., media content item, live content stream) being captured and provided by the camera device. In such embodiments, the filters can be applied based on instructions specified in a faceplate profile associated with the installed faceplate. In some embodiments, such filters may visually modify the content captured by the camera device. For example, in some embodiments, a visual filter (e.g., graphical overlay) may apply a face filter (e.g., mask) to one or more human faces represented in the content. In some embodiments, a visual filter (e.g., graphical overlay) may apply an environment filter (e.g., border) to the content. In some embodiments, a visual filter (e.g., graphical overlay) may modify a color scheme associated with the content. In some embodiments, a form factor (or design) of a given faceplate can inform the type of filters that will be applied to content once the faceplate is installed in the camera device. For example, a faceplate can be designed to resemble a cartoon character. In this example, a faceplate profile associated with the faceplate can instruct the camera device to apply one or more filters to content captured by the camera device. For example, the faceplate profile may instruct the camera device to apply a face filter (e.g., mask) that visually modifies one or more human faces represented in captured content to resemble the cartoon character. Many variations are possible.

The voice feedback module 214 can be configured to audibly convey various information. For example, in some embodiments, the voice feedback module 214 can audibly communicate information such as user interactions with content, countdowns before content is captured, and content captures, to name some examples. In some embodiments, the voice feedback module 214 can audibly communicate (or read) comments posted by users of the social networking system in response to content posted or broadcasted from the camera device. Many variations are possible. In some embodiments, information can be communicated audibly using one or more pre-set human voices that are outputted by the camera device. For example, such voices can be outputted through one or more speakers associated with the camera device and/or audio output jacks. Many variations are possible.

Figure 3:
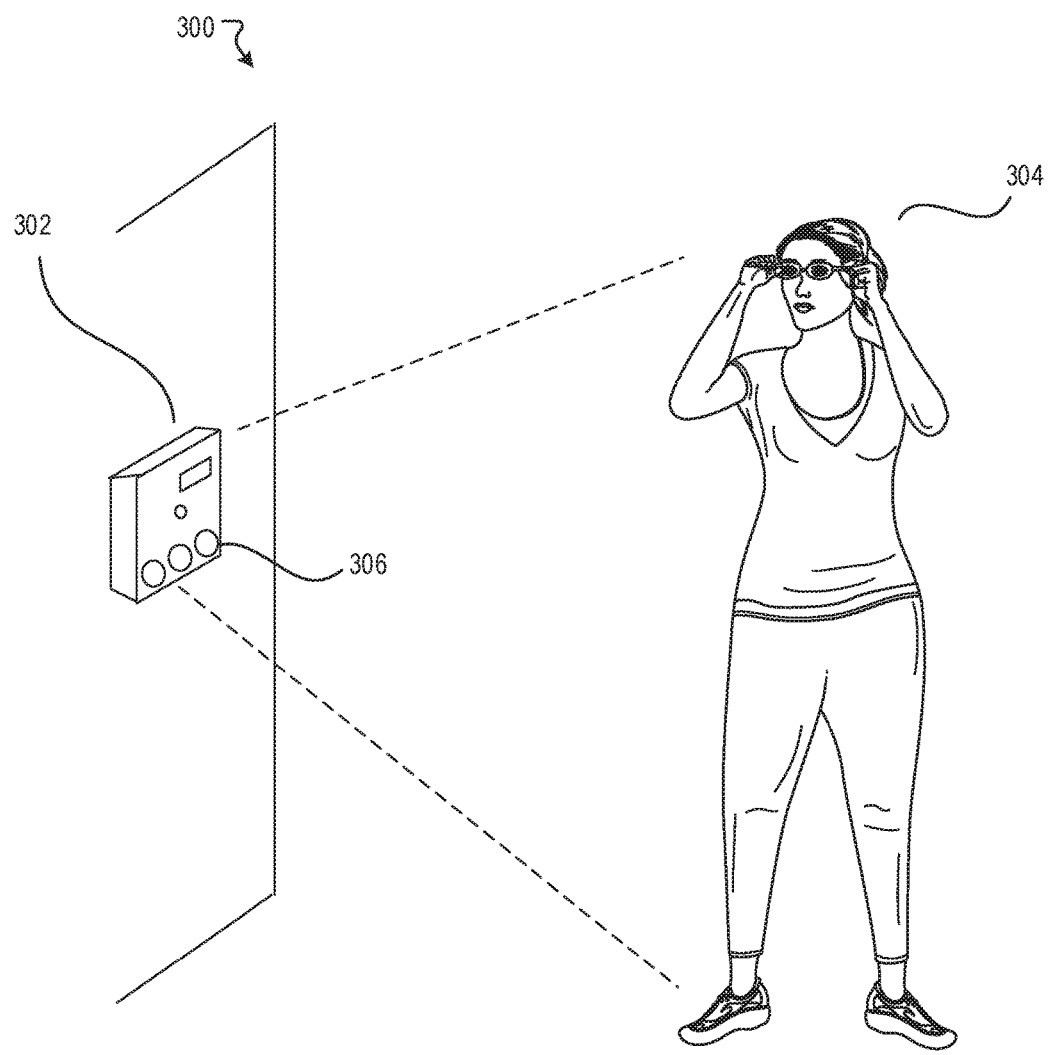
FIG. 3 illustrates an example diagram, according to an embodiment of the present disclosure.

FIG. 3 illustrates an example diagram 300, according to an embodiment of the present disclosure. The example diagram 300 includes a camera device 302 and an individual 304. In this example, the camera device 302 can implement the camera device module 152 of FIG. 1. In some embodiments, the camera device 302 can be instructed to capture content (e.g., media content items, live content streams) of the individual 304. In such embodiments, the captured content can be published (or broadcasted) through a social networking system, as described above. Users can access and interact with the content through the social networking system. In various embodiments, the camera device 302 can include a set of light sources 306 that can be used to visually convey information as described above. For example, the light sources 306 can be used to convey various types of user engagement and interactions with the content that occur through the social networking system.

Figure 4A:
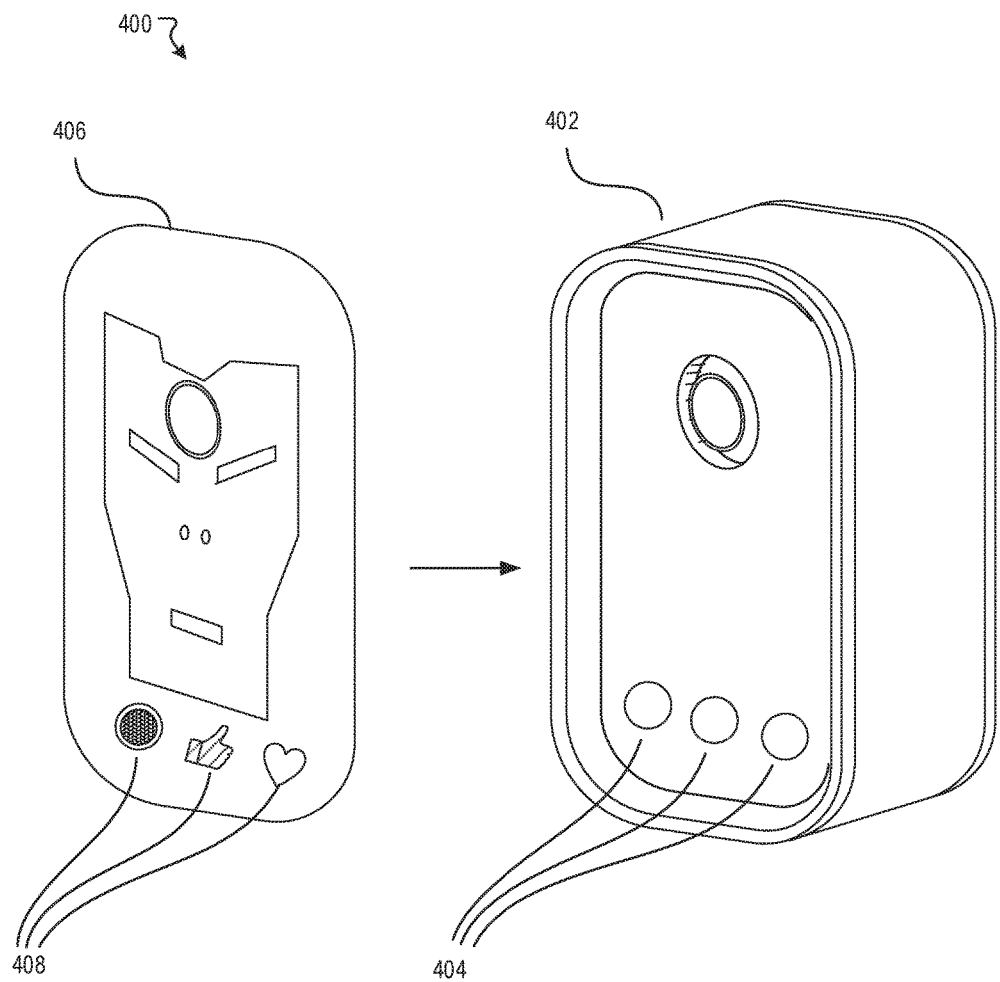
FIGS. 4A-4B also illustrate example diagrams, according to an embodiment of the present disclosure.
Figure 4B:
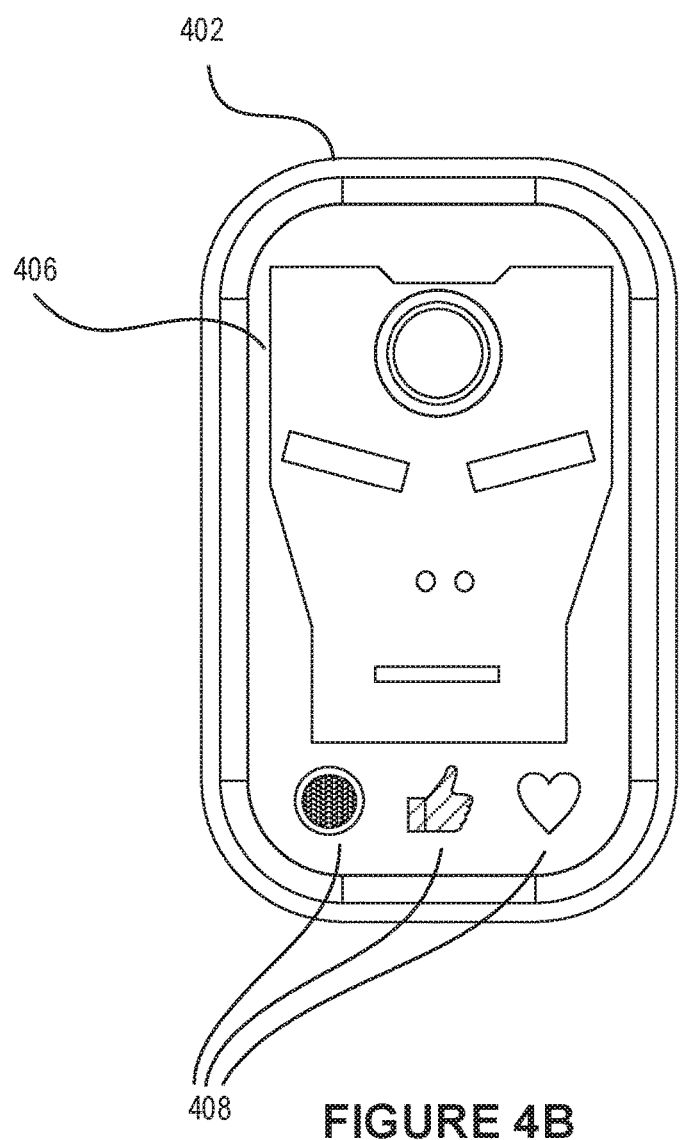

FIG. 4A illustrates an example diagram 400, according to an embodiment of the present disclosure. The example diagram 400 includes a camera device 402. In this example, the camera device 402 includes a set of light sources 404. As discussed, these light sources 404 can be illuminated to convey various information. For example, the light sources 404 can be used to convey user interactions that occur in a social networking system in response to content that is captured and provided by the camera device 402. FIG. 4A also shows a faceplate 406 that can be installed in the camera device 402. The faceplate 406 can be associated with a faceplate profile which includes instructions that can be interpreted by the camera device 402 to modify various settings and/or operations of the camera device 402, as described above. In this example, the faceplate 406 is constructed to correspond to a particular form factor (or design) that represents a cartoon character. Further, the faceplate 406 includes mask outlines 408 associated with icons and/or shapes that can be illuminated at desired levels of translucency or transparency by the light sources 404. Many variations are possible. FIG. 4B illustrates view of the camera device 402 with the faceplate 406 installed. As shown, the mask outlines 408 now correspond to positions of the light sources 404. As a result, when activated, the light sources 404 can be masked to allow illumination through the mask outlines 408 and resulting selective lighting of the icons and/or shapes. Many variations are possible.

Figure 5:
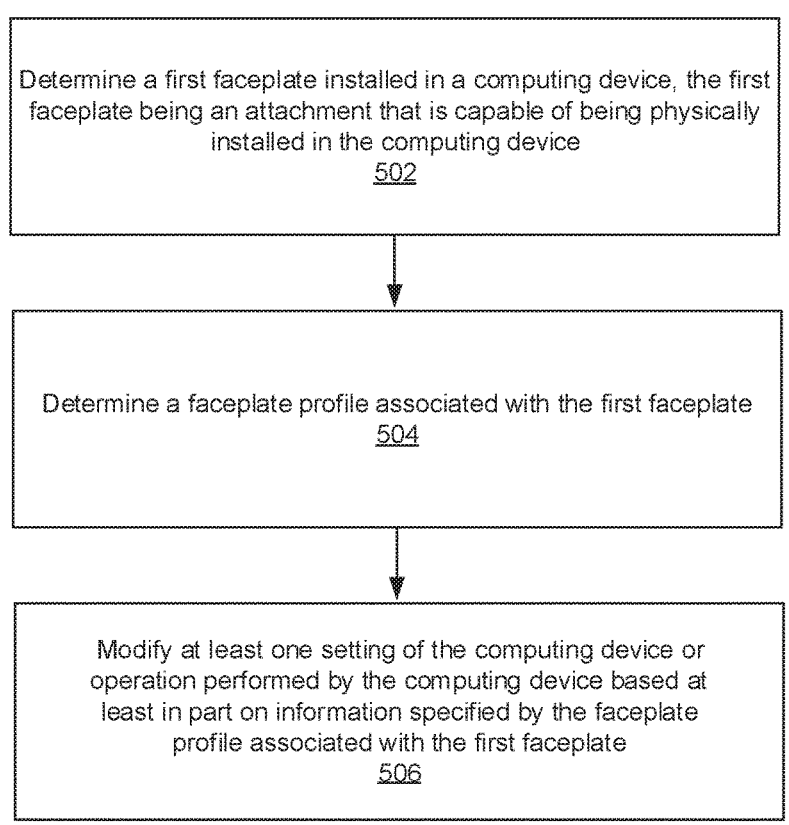
FIG. 5 illustrates an example process, according to various embodiments of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a first faceplate installed in a computing device can be determined. The first faceplate can be an attachment that is capable of being physically installed in the computing device. At block 504, a faceplate profile associated with the first faceplate can be determined. At block 506, at least one setting of the computing device or operation performed by the computing device can be modified based at least in part on information specified by the faceplate profile associated with the first faceplate.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
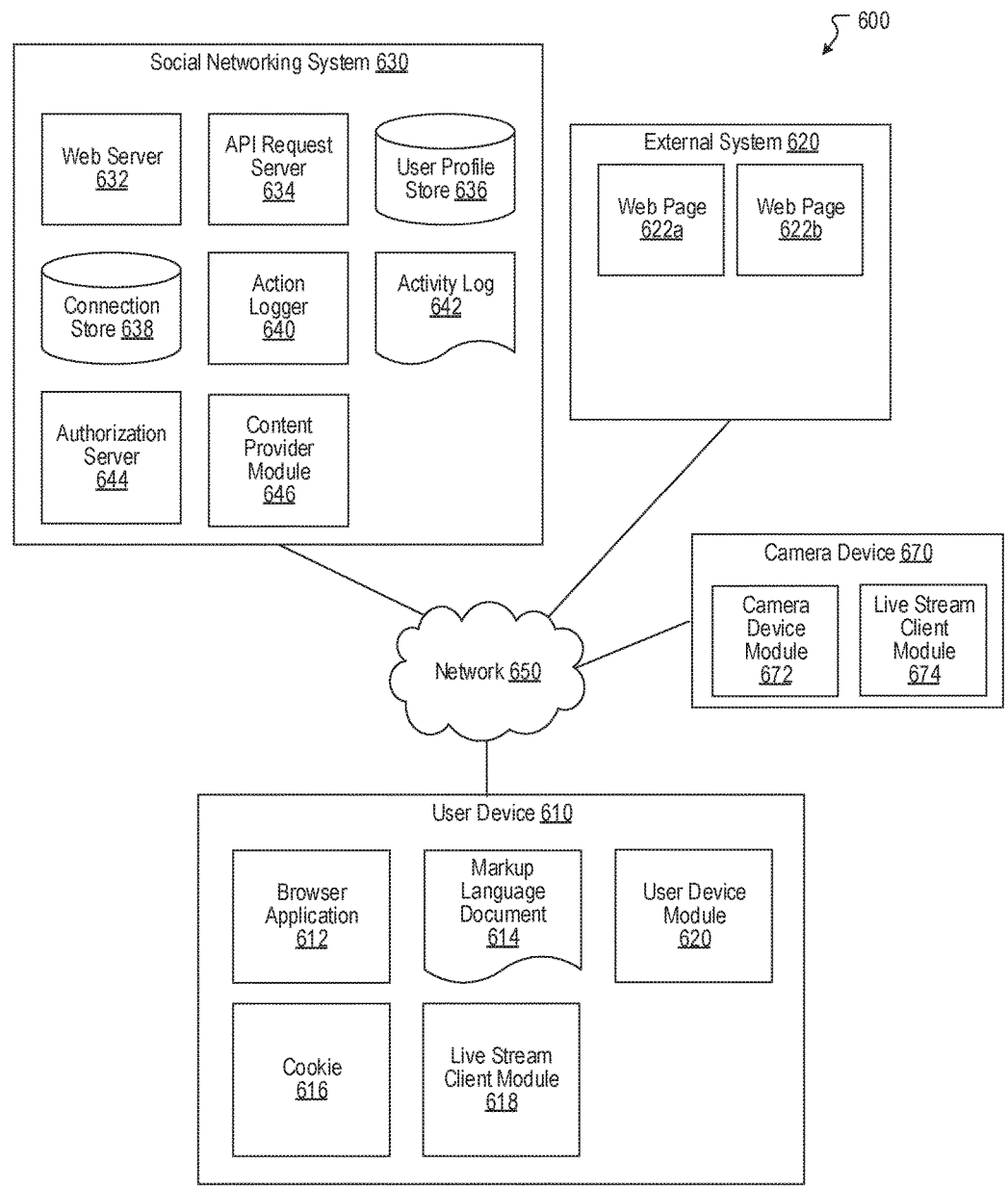
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream client module 618. The live stream client module 618 can be configured to interact with the live stream module 106, for example, for purposes of streaming live content captured by the user device 610. The live stream client module 618 can implement any generally known techniques that allow for live streaming of content including, for example, the Real Time Messaging Protocol (RTMP). The user device module 620 can be implemented as the camera device module 152 of FIG. 1. In some embodiments, a camera device 670 can be configured to interact with the social networking system 630. The camera device 670 can include a camera device module 672 and a live stream client module 674. In some embodiments, the camera device module 672 can be implemented with the camera device module 152. In some embodiments, the live stream client module 674 can be configured to interact with the live stream module 106, for example, for purposes of streaming live content captured by the camera device 670. As discussed previously, it should be appreciated that there can be many variations or other possibilities.

Hardware Implementation

Figure 7:
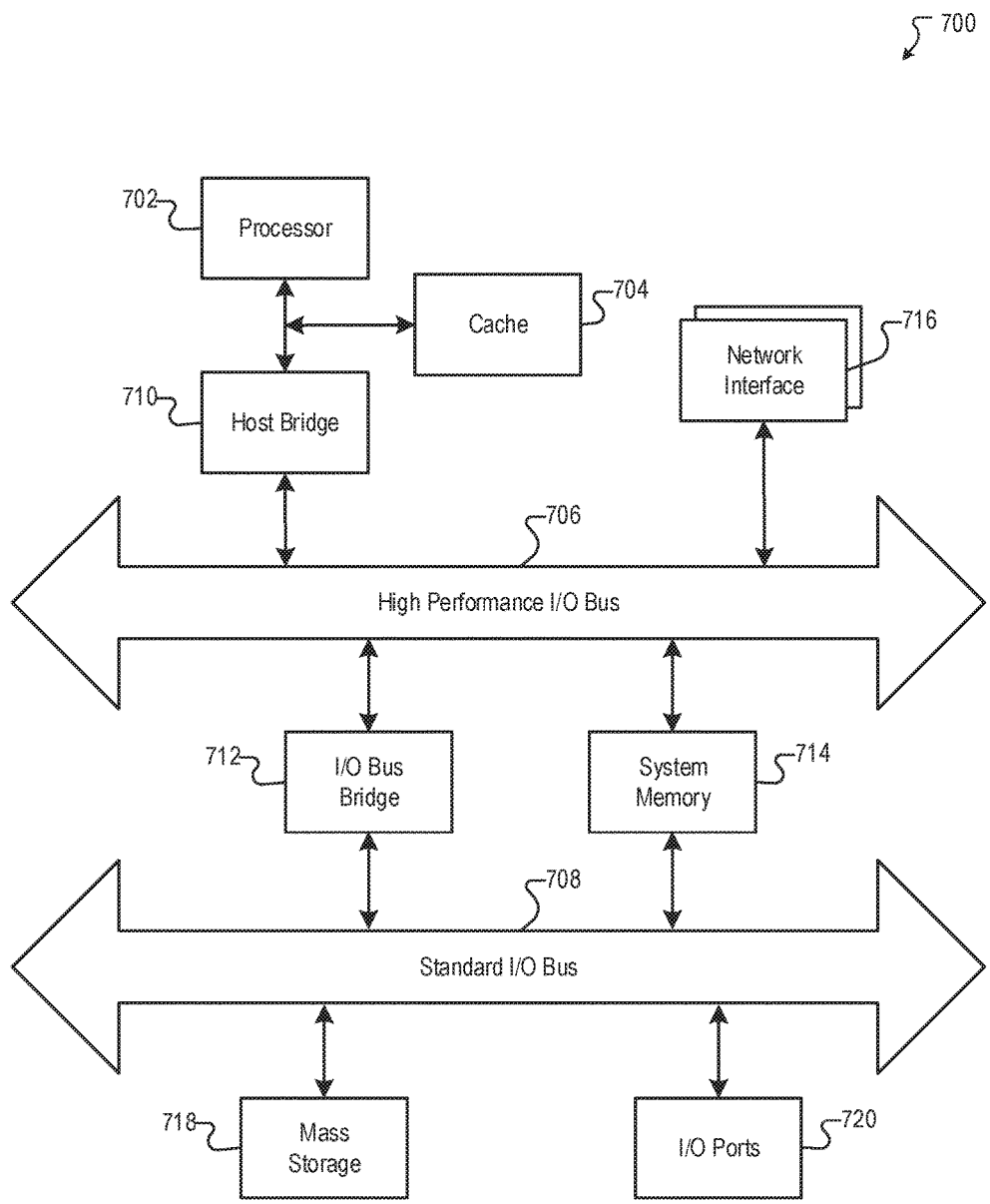
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, a first faceplate installed in the computing device, the first faceplate being an attachment that is capable of being physically installed in the computing device;
   determining, by the computing device, a faceplate profile associated with the first faceplate; and
   modifying, by the computing device, at least one setting of the computing device or operation performed by the computing device based at least in part on information specified by the faceplate profile associated with the first faceplate.

2. The computer-implemented method of claim 1, wherein the information includes instructions for modifying at least one illumination pattern for one or more light sources associated with the computing device.

3. The computer-implemented method of claim 2, wherein the illumination pattern includes at least one of flashing one or more of the light sources, blinking one or more of the light sources, activating one or more light sources that emit a particular color, or activating one or more light sources at a particular brightness level.

4. The computer-implemented method of claim 2, wherein at least one of the light sources is masked by the first faceplate to represent a particular shape or icon.

5. The computer-implemented method of claim 1, wherein the information includes instructions for applying at least one visual filter to content captured by the computing device, wherein the at least one visual filter modifies subject matter represented in the content.

6. The computer-implemented method of claim 5, wherein the at least one visual filter applies at least one face filter to modify at least one human face represented in the captured subject matter.

7. The computer-implemented method of claim 5, wherein the at least one visual filter applies at least one environment filter to modify at least a portion of an environment represented in the captured subject matter.

8. The computer-implemented method of claim 1, wherein content captured by the computing device corresponds to at least a media content item or a live content stream.

9. The computer-implemented method of claim 8, wherein the content is published through a social networking system.

10. The computer-implemented method of claim 1, the method further comprising:
    determining, by the computing device, a second faceplate installed in the computing device, the second faceplate being an attachment that is capable of being physically installed in the computing device;
    determining, by the computing device, a faceplate profile associated with the second faceplate; and
    modifying, by the computing device, at least one setting of the computing device or operation performed by the computing device based at least in part on information specified by the faceplate profile associated with the second faceplate.

11. A system comprising:
    at least one processor; and
    a memory storing instructions that, when executed by the at least one processor, cause the system to perform:
      determining a first faceplate installed in the computing device, the first faceplate being an attachment that is capable of being physically installed in the computing device;
      determining a faceplate profile associated with the first faceplate; and
      modifying at least one setting of the computing device or operation performed by the computing device based at least in part on information specified by the faceplate profile associated with the first faceplate.

12. The system of claim 11, wherein the information includes instructions for modifying at least one illumination pattern for one or more light sources associated with the computing device.

13. The system of claim 12, wherein the illumination pattern includes at least one of flashing one or more of the light sources, blinking one or more of the light sources, activating one or more light sources that emit a particular color, or activating one or more light sources at a particular brightness level.

14. The system of claim 12, wherein at least one of the light sources is masked by the first faceplate to represent a particular shape or icon.

15. The system of claim 11, wherein the information includes instructions for applying at least one visual filter to content captured by the computing device, wherein the at least one visual filter modifies subject matter represented in the content.

16. A non-transitory computer-readable storage medium including instructions that, when executed by at least one processor of a computing system, cause the computing system to perform a method comprising:
    determining a first faceplate installed in the computing device, the first faceplate being an attachment that is capable of being physically installed in the computing device;
    determining a faceplate profile associated with the first faceplate; and
    modifying at least one setting of the computing device or operation performed by the computing device based at least in part on information specified by the faceplate profile associated with the first faceplate.

17. The non-transitory computer-readable storage medium of claim 16, wherein the information includes instructions for modifying at least one illumination pattern for one or more light sources associated with the computing device.

18. The non-transitory computer-readable storage medium of claim 17, wherein the illumination pattern includes at least one of flashing one or more of the light sources, blinking one or more of the light sources, activating one or more light sources that emit a particular color, or activating one or more light sources at a particular brightness level.

19. The non-transitory computer-readable storage medium of claim 17, wherein at least one of the light sources is masked by the first faceplate to represent a particular shape or icon.

20. The non-transitory computer-readable storage medium of claim 16, wherein the information includes instructions for applying at least one visual filter to content captured by the computing device, wherein the at least one visual filter modifies subject matter represented in the content.

\* \* \* \* \*